United States Patent
Shamoto

[11] Patent Number: 5,862,708
[45] Date of Patent: Jan. 26, 1999

[54] SHIFT LEVER DEVICE

[75] Inventor: Noriyasu Shamoto, Aichi-ken, Japan

[73] Assignee: Kabushiki Kaisha Tokai-Rika-Denki-Seisakusho

[21] Appl. No.: 795,515

[22] Filed: Feb. 5, 1997

[30] Foreign Application Priority Data

| Feb. 19, 1996 | [JP] | Japan | 8-029454 |
| Mar. 13, 1996 | [JP] | Japan | 8-056525 |

[51] Int. Cl.⁶ .................................. B60K 20/04
[52] U.S. Cl. ........................ 74/473.18; 74/473.33
[58] Field of Search .................. 74/473.18, 473.12, 74/473.31, 473.3, 473.33

[56] References Cited

U.S. PATENT DOCUMENTS

| 4,732,232 | 3/1988 | Miyahi et al. | 74/473.33 |
| 5,509,322 | 4/1996 | Anderson et al. | 74/473.18 |
| 5,622,079 | 4/1997 | Woeste et al. | 74/473.18 |

FOREIGN PATENT DOCUMENTS

| 230728 | 2/1990 | Japan . |
| 430348 | 3/1992 | Japan . |
| 586652 | 11/1993 | Japan . |
| 617911 | 1/1994 | Japan . |

*Primary Examiner*—Charles A. Marmor
*Assistant Examiner*—David Fenstermacher
*Attorney, Agent, or Firm*—Sixbey Friedman Leedom & Ferguson; Thomas W. Cole

[57] ABSTRACT

A shift lever device includes: a shift lever capable of selecting an arbitrary shift range among a plurality of shift ranges by a shifting operation; a T-shaped shaft whose horizontal portion is pivotally supported in such a manner as to be rotatable in a longitudinal direction of a vehicle and whose leg portion extends upward; and a connecting portion provided on an outer periphery of the leg portion so as to pivotally support the shift lever in such a manner that the shift lever is rotatable between a first position where a longitudinal direction of the shift lever is parallel with a longitudinal direction of the leg portion and a second position to which the shift lever is rotated in a transverse direction of the vehicle. Accordingly, since the shift lever is connected to the T-shaped shaft, which is stable in terms of its strength, via the connecting portion in such a manner as to be rotatable in a direction perpendicular to the rotating direction of the T-shaped shaft, the shift lever device can be applied to various shift patterns.

15 Claims, 6 Drawing Sheets

FIG. 6A PRIOR ART

SHIFT LEVER DEVICE

BACKGROUND OF THE INVENTION

1. Field of the Invention

The present invention relates to a shift lever device used for a transmission of a vehicle.

2. Description of the Related Art

A shift lever for shifting an automatic transmission is passed through a guide slot formed in a box-shaped housing, and a desired shift range can be selected as the shift lever is moved along the guide slot.

Figure 6A:
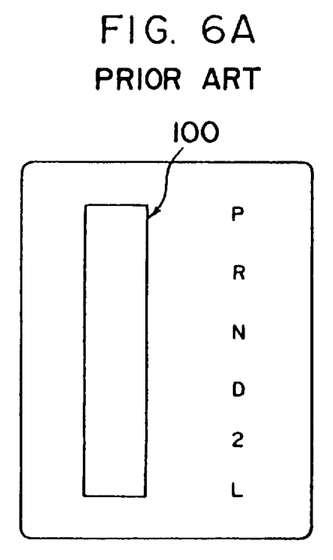
FIG. 6A is a plan view illustrating a pattern of a straight-type guide slot in a conventional shift lever device.
Figure 6B:
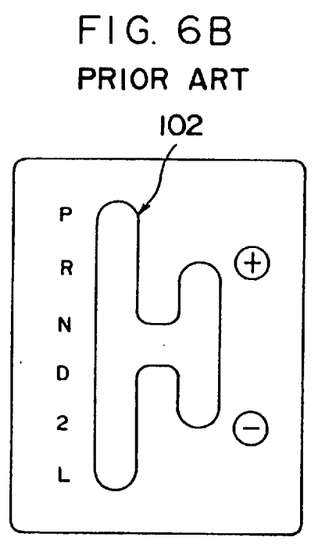
FIG. 6B is a plan view illustrating a pattern of an H-pattern-type guide slot in a conventional shift lever device and FIG. 6C is a plan view illustrating a pattern of a gate-type guide slot in a conventional shift lever device.
Figure 6C:
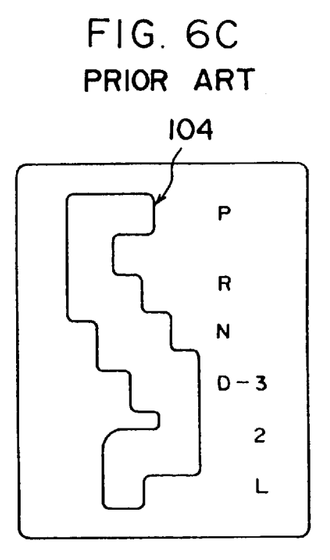

As shown in FIGS. 6A to 6C, various types including a straight type 100, an H-pattern type 102, and a gate type 104 are used as patterns of the guide slot. Conventionally, it has been necessary to manufacture members for changing over a shift position so as to make it possible to cope with the movement of the shift lever in the longitudinal and transverse directions of the vehicle, so that the structures of the shift lever devices have been complicated. For this reason, it has been difficult to use the parts in common, with the result that the manufacturing cost has been high.

In addition, a rubber-made cushion gate, which is fabricated in conformity with the configuration of the guide slot, is conventionally attached to wall portions of the guide slot so as to alleviate the striking sound when the shift lever strikes against the wall of the guide slot. However, the configurations of the cushion gates are complicated, resulting in an increase in the number of parts used.

SUMMARY OF THE INVENTION

In view of the above-described circumstances, it is a primary object of the present invention to provide a shift lever device which makes it possible to use the members for changing over the shift position in common and of simplifying the structure, thereby making it possible to use the parts in common and lower the cost.

Another object of the present invention is to provide a shift lever device which is capable of alleviating the striking sound.

To these ends, in accordance with a first aspect of the present invention, there is provided a shift lever device comprising: a shift lever capable of selecting an arbitrary shift range among a plurality of shift ranges by a shifting operation; a T-shaped shaft whose horizontal portion is pivotally supported in such a manner as to be rotatable in a longitudinal direction of a vehicle and whose leg portion extends upward; and a connecting portion provided on an outer periphery of the leg portion so as to pivotally support the shift lever in such a manner that the shift lever is rotatable between a first position where a longitudinal direction of the shift lever is parallel with a longitudinal direction of the leg portion and a second position to which the shift lever is rotated in a transverse direction of the vehicle.

In accordance with the above-described first aspect, by merely providing the connecting portion on the leg portion of the T-shaped shaft which is stable in terms of its strength, the shift lever can be rotated in the longitudinal direction of the vehicle and in the transverse direction of the vehicle (i.e., from the first position to the second position and vice versa). Since the shift lever is connected to the T-shaped shaft, which is stable in terms of its strength, via the connecting portion in such a manner as to be rotatable in a direction perpendicular to the rotating direction of the T-shaped shaft, the shift lever device can be applied to various shift patterns.

In accordance with a second aspect of the present invention, the shift lever device in the above-described first aspect further comprises guiding means through which the shift lever is passed, and which permits the rotation of the shift lever in the longitudinal direction of the vehicle, and permits the rotation of the shift lever from the first position to the second position only with respect to a predetermined shift range among the plurality of shift ranges.

In the shift lever device in accordance with the above-described second aspect, the shift lever supported at the connecting portion of the T-shaped shaft is shifted (rotated) in the longitudinal direction of the vehicle while being guided by the guiding means. Further, in the predetermined shift range the shift lever is shifted (rotated) in the transverse direction of the vehicle (i.e., from the first position to the second position) as well.

In accordance with a third aspect of the present invention, the shift lever device in the above-described first aspect further comprises clicking means provided on the connecting portion so as to impart a click to the shift lever when the shift lever is rotated between the first position and the second position.

In the shift lever device in accordance with the above-described third aspect, a click is imparted to the shift lever when the shift lever is rotated between the first position and the second position, with the result that an operator's feeling in operating the shift lever can be improved. In addition, since the clicking means is provided on the connecting portion, the structure of the shift lever can be simplified.

In accordance with a fourth aspect of the present invention, there is provided a shift lever device comprising: a housing having a guide slot for guiding a shift lever into an arbitrary shift range among a plurality of shift ranges; a slider through which the shift lever is passed and which moves integrally with the shift lever; and a cushioning leg provided on the slider in a projecting manner and adapted to move along a wall of the guide slot.

In accordance with the above-described fourth aspect, a cushion gate for preventing the striking sound need not be provided separately for the guide slot in the conventional manner. Since the slider for shielding the guide slot is provided with a cushioning function, it is possible to reduce the number of parts used.

The above and other objects, features and advantages of the present invention will become more apparent from the following detailed description of the invention when read in conjunction with the accompanying drawings.

DESCRIPTION OF THE PREFERRED EMBODIMENTS

Figure 1:
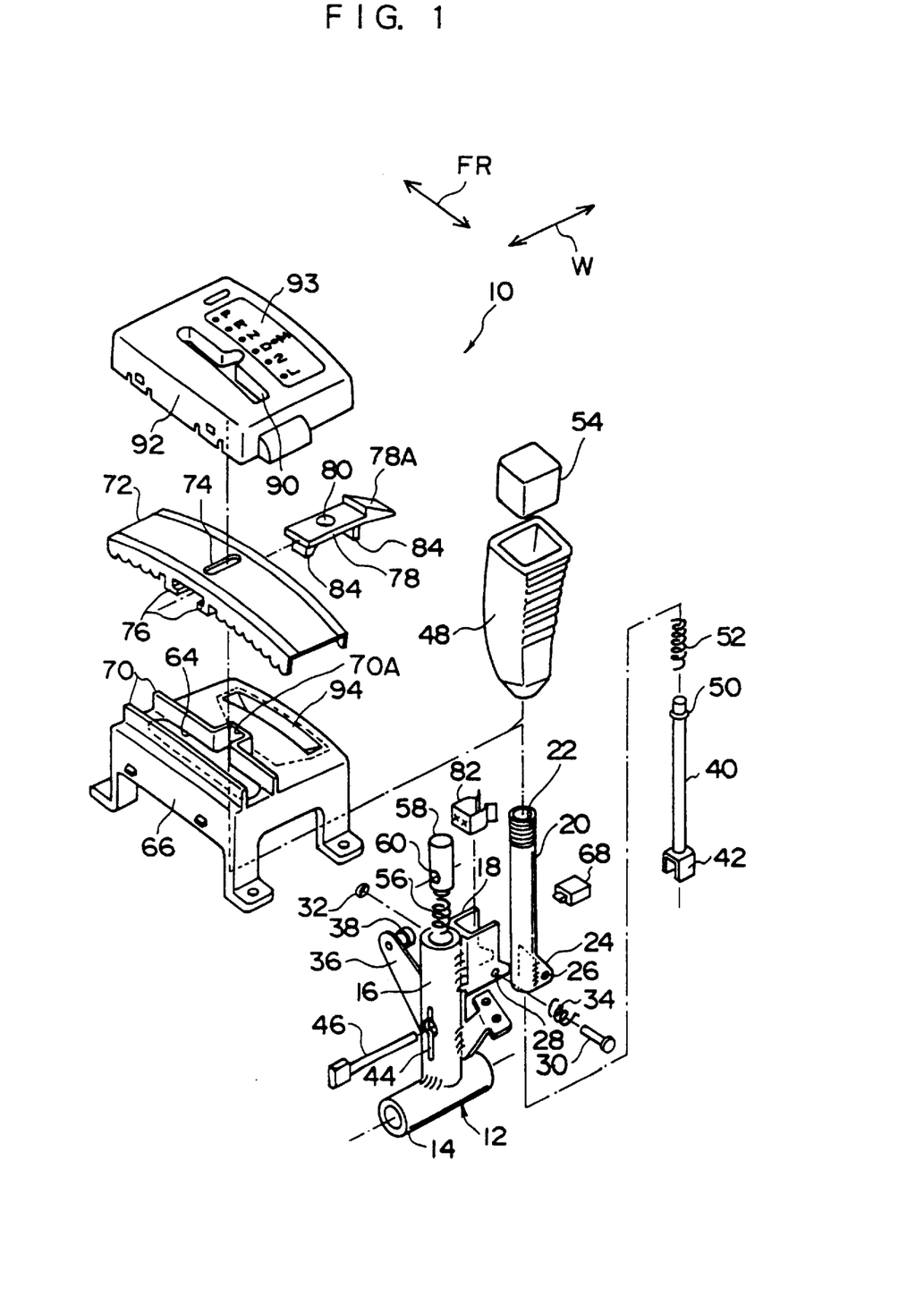
FIG. 1 is an exploded perspective view illustrating an overall arrangement of a shift lever device in accordance with an embodiment of the present invention.
Figure 2:
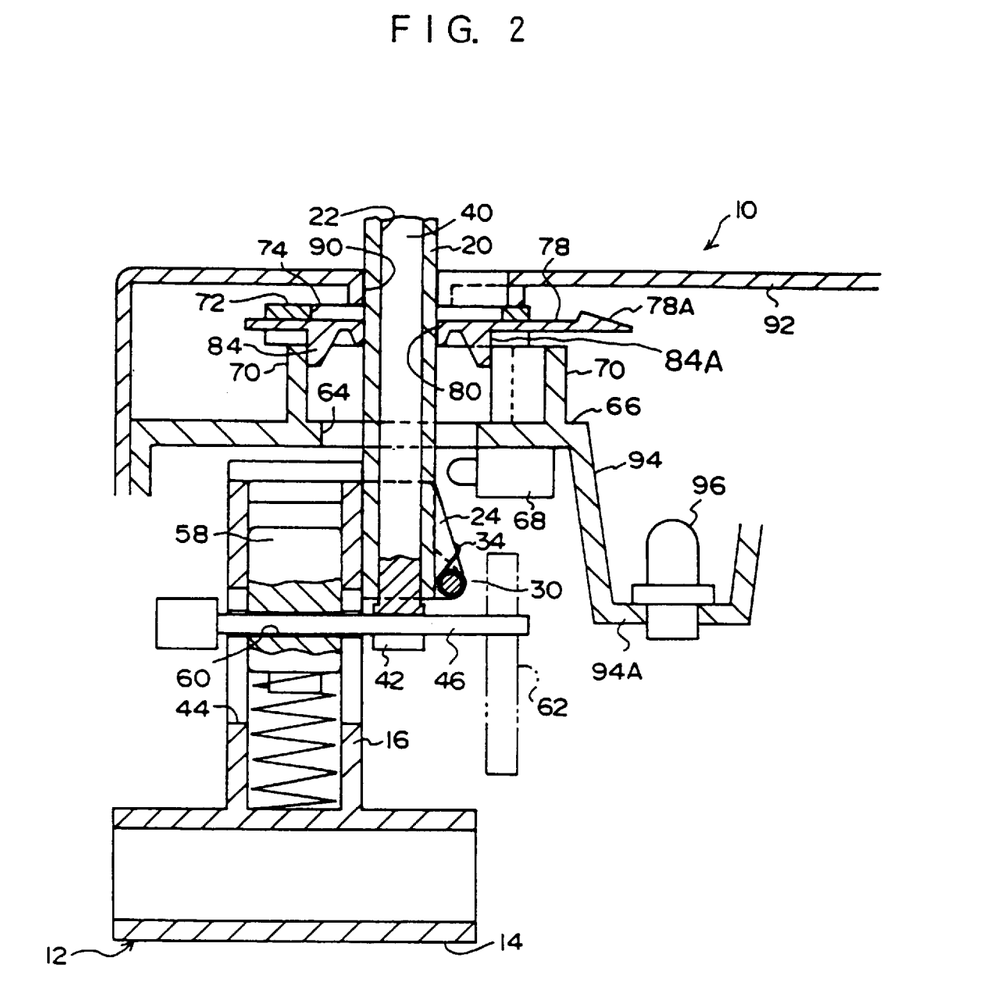
FIG. 2 is a cross-sectional view, taken in a longitudinal direction of a vehicle, of a shift lever of the shift lever device in accordance with the embodiment of the present invention which is in an upright state.
Figure 3:
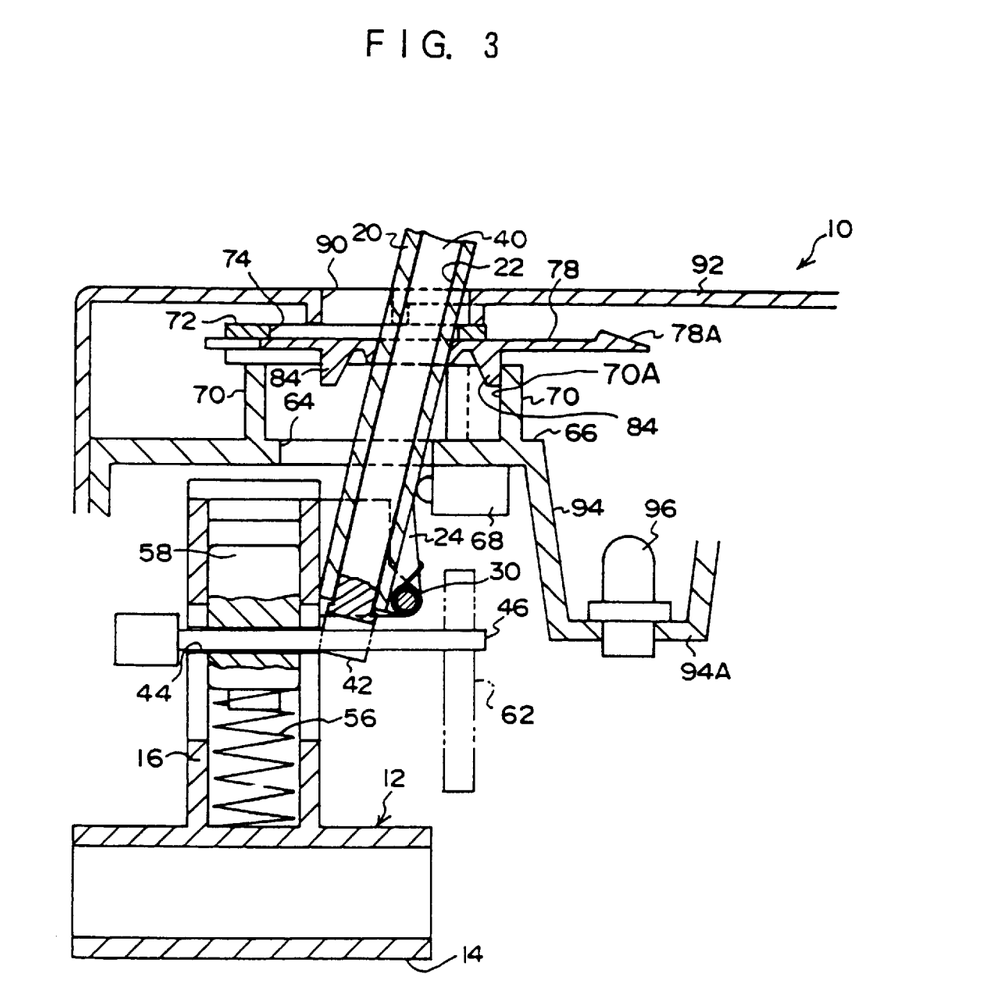
FIG. 3 is a cross-sectional view, taken in the longitudinal direction of the vehicle, of the shift lever of the shift lever device in accordance with the embodiment of the present invention which is in a state of being inclined in a transverse direction of the vehicle.
Figure 4:
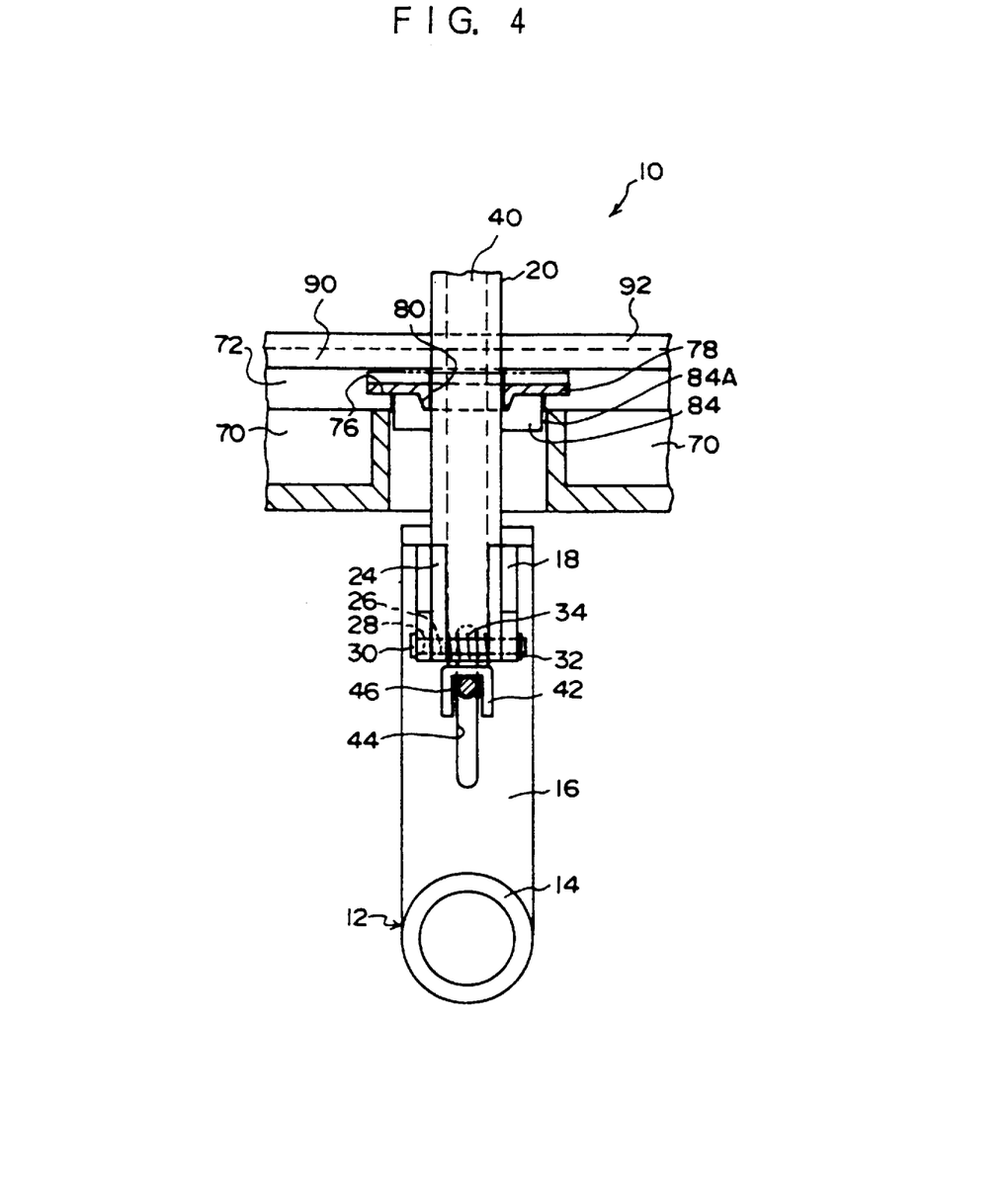
FIG. 4 is a cross-sectional view, taken in the transverse direction of the vehicle, of the shift lever of the shift lever device in accordance with the embodiment of the present invention.

FIG. 1 shows an exploded perspective view of an overall arrangement of a shift lever device 10 in accordance with an embodiment of the present invention. In addition, FIGS. 2 to 4 show cross-sectional views of the shift lever device 10. Incidentally, in FIG. 1, arrow FR denotes a longitudinal direction of a vehicle, and arrow W denotes a transverse direction of the vehicle.

The shift lever device 10 has a T-shaped shaft 12 for changing over the shift position. The T-shaped shaft 12 is a hollow cylindrical T-shaped pipe, and an unillustrated control shaft is inserted in its horizontal portion 14 in such a manner as to be rotatable in the longitudinal direction FR of the vehicle.

Meanwhile, a U-shaped bracket 18 constituting a connecting portion is provided on an outer periphery of a leg portion 16 o the T-shaped shaft 12 such that its side walls are spaced apart a predetermined interval therebetween and project in the lateral direction of the leg portion 16. A lower end of a hollow cylindrical shift lever 20 having a through hole 22 as its hollow portion is attached to the U-shaped bracket 18. A pair of brackets 24 jut out laterally from the lower end of the shift lever 20. Shaft holes 26 are respectively formed in the brackets 24, and a supporting pin 30 is inserted in the shaft holes 26 and secured by a bush nut 32 in a state in which the shaft holes 26 are aligned with shaft holes 28 formed in the side walls of the bracket 18. Consequently, the shift lever 20 is rotatable in the transverse direction W of the vehicle with the supporting pin 30 as its axis. Incidentally, a coil spring 34 is loaded between the brackets 24, and one end thereof is retained at the bracket 24 and the other end thereof is retained at the U-shaped bracket 18, thereby urging the shift lever 20 such that the shift lever 20 is set in an upright state.

Further, a clicking plate 82 constituting a clicking mechanism is secured to a bottom of the U-shaped bracket 18. The clicking plate 82 is a substantially U-shaped leaf spring, and nips the shift lever 20 in a state of pressure contact. As a result, the shift lever 20 is held by the clicking plate 82, and is movable with a click between an upright state in which the shift lever 20 is parallel with the axis of the leg portion 16 of the T-shaped shaft 12 and an inclined state in which the shift lever 20 is inclined by being rotated in the transverse direction of the vehicle.

In addition, a control lever 36 projects from the leg portion 16, and a pin 38 provided at a distal end of the control lever 36 is connected to an automatic transmission via an unillustrated transmission mechanism, so as to shift the automatic transmission by the operation of the shift lever 20.

Meanwhile, a rod 40 is inserted in the through hole 22 of the shift lever 20 from its lower opening. A channel-shaped receiving portion 42 is formed at a lower end of the rod 40. An elongated hole 44 which is elongated in the longitudinal direction of the leg portion 16 is formed in an opposing portion of the wall of the leg portion 16 in such a manner as to oppose the receiving portion 42. The receiving portion 42 receives a position pin 46 which is passed through the elongated hole 44.

In addition, an upper end portion of the rod 40 projects from the through hole 22, and extends into a knob 48 which is threadedly engaged on the shift lever 20. A snap fitting 50 is attached to the rod 40 in the vicinity of the upper end thereof, and a button 54 is attached to the snap fitting 50 with a spring 52 loaded therebetween. The button 54 is secured to the rod 40 without rattling by virtue of the spring 52.

The button 54 is slidable vertically inside the knob 48, and as the button 54 is pushed, the position pin 46 can be pushed down along the elongated hole 44.

The position pin 46 is passed through a horizontal hole 60 formed in a detent rod 58 which is inserted into the leg portion 16 together with a spring 56. The position pin 46 is held at a predetermined position in the elongated hole 44 by means of the detent rod 58 which is urged upward by the spring 56.

Meanwhile, one end portion of the position pin 46 is inserted in an unillustrated detent groove formed in a detent plate 62. This detent groove has a shape in which projections and indentations related to various shift ranges continue. The arrangement provided is such that unless the position pin 46 is pushed down along the elongated hole 44 by pressing the button 54, the shift lever 20 cannot be moved to an adjacent shift range, but between specific shift ranges the position pin 46 can ride over the projection in the detent groove by merely operating the shift lever 20 in the longitudinal direction of the vehicle by means of the knob 48 without pushing down the button 54.

Figure 5:
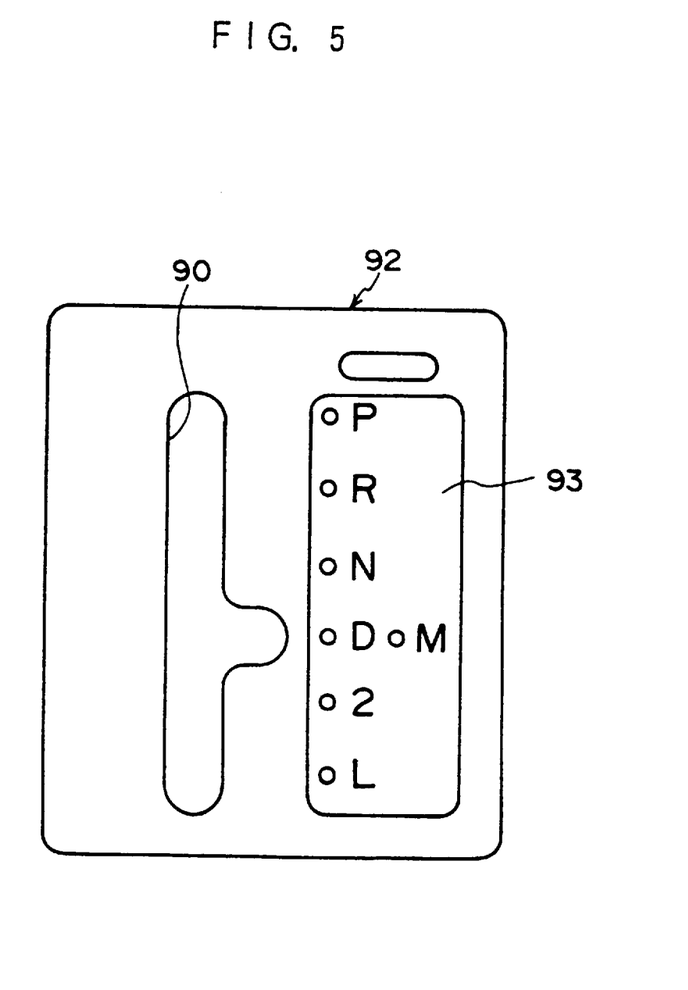
FIG. 5 is a plan view illustrating a pattern of a guide slot in the shift lever device in accordance with the embodiment of the present invention.

A lower housing 66 and an upper housing 92 are disposed above the T-shaped shaft 12, and are secured to the floor of an unillustrated vehicle compartment. A guide slot 64 through which the shift lever 20 is passed is formed in the lower housing 66, while a guide slot 90 corresponding to the guide slot 64 is formed in the upper housing 92. As shown in FIG. 5, the guide slot 90 (guide slot 64) is comprised of a straight portion corresponding to ranges including a "P" shift range through an "L" shift range as well as an indentation for an "M" shift range (manual mode) located laterally of a "D" shift range. The shift lever 20 is passed through the guide slot 64. As a result, in the upright state in which the shift lever 20 is parallel with axis of the leg portion of the T-shaped shaft 12, the shift lever 20 held by the clicking plate 82 is movable together with the T-shaped shaft 12 in the ranges including the "D" shift range through the "L" shift range without the pressing down of the button 54. Further, if the shift lever 20 in the "D" shift range is rotated in the transverse direction (W) of the vehicle, the shift lever 20 is set in the inclined state, thereby allowing a shift into the "M" shift range.

A plate 93, on which initials such as "R," "N," "D," and the like are printed in correspondence with the shift ranges, is fitted alongside the guide slot 90 in the upper housing 92.

A microswitch 68 is attached to a reverse surface of the lower housing 66. The microswitch 68 is provided at a position corresponding to the "M" shift range, and when the shift lever 20 in the "D" shift range is rotated in the transverse direction (W) of the vehicle and is set in the inclined state, and the shift lever 20 is thereby shifted into the "M" shift range, the microswitch 68 is pressed by a side portion of the shift lever 20, thereby making it possible to detect the shifting of the shift lever 20 into the "M" shift range.

A pair of receiving seats 70 are respectively provided along sides of the guide slot 64 in the lower housing 66 in such a manner as to extend upward. A tabular slide cover 72 is slidably mounted on the receiving seats 70. An elongated hole 74 is formed in a central portion of the slide cover 72 in such a manner as to extend in its transverse direction. The shift lever 20 is passed through the elongated hole 74, is moved integrally with the shift lever 20 in the longitudinal direction (FR) of the vehicle, and permits operation of the shift lever 20 in the transverse direction (W) of the vehicle.

Meanwhile, a pair of L-shaped slide guides 76 are provided on the reverse surface of the slide cover 72 in such a manner as to extend in its transverse direction on both sides of the elongated hole 74. A slider 78 is fitted to the slide guides 76 in such a manner as to transverse the slide cover 72. A pawl-like display portion 78A is formed at a distal end of the slider 78 as viewed in its inserting direction, so that the slider 78 is prevented from coming off the slide guides 76.

A circular hole 80, through which the shift lever 20 is passed, is formed in the slider 78. An annular boss (not shown) is formed at a peripheral edge of the circular hole 80 on a lower surface of the slider 78 in such a manner as to surround the peripheral side surface of the shift lever 20. In addition, a pair of tabular cushioning legs 84 are provided on the lower surface of the slider 78 on both sides of the circular hole 80 in such a manner as to extend in the transverse direction of the slider 78, respectively. An interval between outer side surfaces 84A of the tabular cushioning legs 84 is set to be slightly narrower than an interval between inner side surfaces of the receiving seats 70, and small gaps are respectively formed between their opposing surfaces. Further, the longitudinal length of each of the cushioning legs 84 is set to be slightly smaller than the width of an indented portion 70A formed in one of the receiving seats 70 in such a manner as to extend outwardly and correspond to the "M" shift range. Hence, in a case where the shift lever 20 is positioned in the "M" shift range, a small gap is formed between each longitudinal end of the cushioning leg 84 and each opposing wall portion constituting the indented portion 70A.

As the gap between the cushioning leg 84 and the receiving seat 70 is made smaller than a gap between the guide slot 64 and the shift lever 20 as shown in FIGS. 2 and 3, when the shift lever 20 is moved from the "D" shift range to the "M" shift range, the shift lever 20 is prevented from striking against the receiving seat 70 and the edge of the guide slot 64 as the cushioning leg 84 abuts against the receiving seat 70.

Incidentally, the slider 78 is formed of a soft material such as a rubber-based, an elastomer-based, or polypropylene-based material, so that cushioning characteristics are ensured.

Further, an elongated recessed portion 94 is formed in the lower housing 66 in such a manner as to extend substantially parallel with the guide slot 64. A lamp 96 is disposed at a bottom 94A of the recessed portion 94. The lamp 96 is adapted to illuminate the display portion 78A of the slider 78 from below.

Next, a description will be given of the operation of the shift lever device 10 in accordance with this embodiment.

In the shift lever device 10, the shift lever 20 supported by the U-shaped bracket 18 of the T-shaped shaft 12 is normally set in the upright state in which the shift lever 20 is parallel with the axis of the leg portion 16 of the T-shaped shaft 12 as it is held by the clicking plate 82. If the shift lever 20 is shifted in this state, the shift lever 20 is shifted in the longitudinal direction (FR) of the vehicle along the guide slot 90 (guide slot 64), allowing an arbitrary shift range among the "D" to "L" shift ranges to be selected.

In addition, if the shift lever 20 is rotated in the transverse direction (W) of the vehicle with the shift lever 20 positioned in the "D" shift range, the shift lever 20 is set in the inclined state and is thereby shifted into the "M" shift range, so that the "M" shift range is selected. At the time of this shifting, the shift lever 20 is moved into the indented portion 70A, but the outer surface 84A of the cushioning leg 84 abuts against the edge of the indented portion 70A of the receiving seat 70 before the shift lever 20 strikes against the edges of the indented portion 70A and the guide slot 64, so that the striking sound can be alleviated. Further, at the same time, the microswitch 68 provided on the reverse surface of the lower housing 66 is pressed by the side portion of the shift lever 20, so that the shifting of the shift lever 20 into the "M" shift range can be detected. An unillustrated upshift/downshift switch is set in an operable state on the basis of that detection, allowing a manual shift to be carried out.

In this case, as for the shift lever 20 which is shifted from the "D" shift range by being rotated in the transverse direction of the vehicle, the shift lever 20 in the "D" shift range is held by the clicking plate 82, and is moved between the upright state and the inclined state with a click. Accordingly, it is possible to prevent inadvertent movement of the shift lever 20 and improve the operating characteristic (an operator's operational feeling).

Thus, since the shift lever device 10 is not only arranged such that the shift lever 20 can be shifted in the longitudinal direction of the vehicle, but is also arranged such that the leg portion 16 of the T-shaped shaft 12, which is stable in terms of its strength, is provided with the U-shaped bracket 18, and the shift lever 20 is rotatably supported by the bracket 18, the shift lever 20 can be shifted in the transverse direction of the vehicle as well. That is, by merely attaching the bracket 18 to the outer periphery of the leg portion 16 by means of welding or the like, the T-shaped shaft 12 can be used as a common member for changing over the shift position.

Further, in accordance with the shift lever device 10, since the clicking mechanism for holding and clickably moving the shift lever 20 in the "D" shift range can be arranged by simply providing the clicking plate 82 on the bracket 18, the structure can be simplified substantially.

What is claimed is:

1. A shift lever device comprising:

a shift lever capable of selecting an arbitrary shift range among a plurality of shift ranges by a shifting operation;

a T-shaped shaft whose horizontal portion is pivotally supported in such a manner as to be rotatable in a longitudinal direction of a vehicle and whose leg portion extends upward;

a connecting portion provided on an outer periphery of said leg portion so as to pivotally support said shift lever in such a manner that said shift lever is rotatable between a first position where a longitudinal direction of said shift lever is parallel with a longitudinal direction of said leg portion and a second position to which said shift lever is rotated in a transverse direction of the vehicle, and clicking means provided on said connecting portion so as to impart a click to said shift lever when said shift lever is rotated between the first position and the second position.

2. A shift lever device for operating a transmission of a vehicle, comprising:

a pipe rotatable in a longitudinal direction of a vehicle;

a shift lever disposed parallel to said pipe;

a shaft supporting said shift lever at said pipe such that said shift lever is rotatable, with respect to said pipe, in a direction intersecting a direction in which said pipe rotates; and a detent pin provided on said pipe, said detent pin engaging a portion of a vehicle body so as to control rotation of said pipe in the longitudinal direction of the vehicle.

3. A shift lever device according to claim 1 wherein said clicking means is a spring member for nipping said shift lever with a spring force when said shift lever is located at the first position.

4. A shift lever device according to claim 1, further comprising guiding means through which said shift lever is passed, and which permits the rotation of said shift lever in the longitudinal direction of the vehicle, and permits the rotation of said shift lever from the first position to the second position only with respect to a predetermined shift range among the plurality of shift ranges.

5. A shift lever device according to claim 4, wherein said guiding means is a guide member having a guide hole through which said shift lever is passed, and which extends in the longitudinal direction of the vehicle to permit the rotation of said shift lever in the longitudinal direction of the vehicle, and partially projects in the transverse direction of the vehicle in correspondence with the predetermined shift range to permit the rotation of said shift lever between the first position and the second position.

6. A shift lever device according to claim 5, further comprising a cushioning member through which said shift lever is passed, and which moves together with said shift lever and abuts against an edge of said guide hole during the rotation of said shift lever in the transverse direction of the vehicle, so as to reduce a striking sound.

7. A shift lever device according to claim 6, wherein said cushioning member is formed of a soft material.

8. A shift lever device according to claim 4, further comprising clicking means provided on said connecting portion so as to impart a click to said shift lever when said shift lever is rotated between the first position and the second position.

9. A shift lever device comprising:

a housing having a guide slot for guiding a shift lever into an arbitrary shift range among a plurality of shift ranges;

a slider having an opening through which said shift lever is passed an edge of said opening in contact with said shift lever such that said slider moves integrally with said shift lever; and a cushioning leg provided on said slider in a projecting manner and which moves along a wall of the guide slot in order to abut said housing before said shift lever abuts an edge of said guide slot to reduce a sound of impact between said shift lever and said guide slot.

10. A shift lever device according to claim 9, wherein said slider is formed of a soft material.

11. A shift lever device comprising:

a shift lever capable of selecting an arbitrary shift range among a plurality of shift ranges by a shifting operation;

a T-shaped shaft whose horizontal portion is pivotally supported in such a manner as to be rotatable in a longitudinal direction of a vehicle and whose leg portion extends upward; and a connecting portion provided on a side portion of said leg portion so as to pivotally support said shift lever in such a manner that said shift lever is rotatable in a transverse direction relative to said vehicle, said rotatable motion being limited between a first position where a side of said leg portion forms an abutment and is parallel with a side of said shift lever, and a second position to which said shift lever is rotated away from said leg portion.

12. A shift lever device according to claim 11, wherein said connecting portion includes a bracket mounted on a side of said leg portion, and a pivotal connection means for pivotally connecting said shift lever to said bracket.

13. A shift lever device for operating a transmission of a vehicle, comprising:

a pipe rotatable in a longitudinal direction of a vehicle;

a shift lever disposed parallel to said pipe;

a shaft supporting said shift lever at said pipe such that said shift lever is rotatable, with respect to said pipe, in a direction intersecting a direction in which said pipe rotates; and a control mechanism, a portion of said control mechanism being provided within the pipe, and another portion of said control mechanism projecting from said pipe and engaging a portion of a vehicle body, said control mechanism controlling rotation of said pipe in the longitudinal direction of the vehicle.

14. A shift lever device according to claim 13, wherein said control mechanism includes a detent pin which passes through said pipe in a direction orthogonal to an axial direction of said pipe.

15. A shift lever device according to claim 14, wherein a spring is provided within said pipe, said spring urging the detent pin in the axial direction of said pipe.

* * * * *